(12) United States Patent
Furukawa

(10) Patent No.: US 6,656,089 B2
(45) Date of Patent: Dec. 2, 2003

(54) VALVE TIMING CONTROL SYSTEM FOR INTERNAL COMBUSTION ENGINE

(75) Inventor: Tomoya Furukawa, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/242,689

(22) Filed: Sep. 13, 2002

(65) Prior Publication Data

US 2003/0054921 A1 Mar. 20, 2003

(30) Foreign Application Priority Data

Sep. 14, 2001 (JP) ........................................ 2001-280023

(51) Int. Cl.$^7$ ................................................. F01L 1/34
(52) U.S. Cl. ..................................... 477/111; 123/90.15
(58) Field of Search ................................ 477/107, 111; 123/90.15, 90.16, 90.17

(56) References Cited

U.S. PATENT DOCUMENTS

| | | | | | |
|---|---|---|---|---|---|
| 5,558,051 | A | * | 9/1996 | Yoshioka | 123/90.15 |
| 6,076,492 | A | * | 6/2000 | Takahashi | 123/90.17 |
| 6,217,477 | B1 | * | 4/2001 | Nobumoto et al. | 477/107 |
| 6,505,585 | B1 | * | 1/2003 | Machida et al. | 123/90.15 |
| 6,516,254 | B1 | * | 2/2003 | Wakashiro et al. | 701/22 |

FOREIGN PATENT DOCUMENTS

| | | | |
|---|---|---|---|
| JP | 2000-104571 | * | 4/2000 |
| JP | 2001-263102 | * | 9/2001 |

* cited by examiner

*Primary Examiner*—Sherry Estremsky
(74) *Attorney, Agent, or Firm*—Arent Fox Kintner Plotkin & Kahn, PLLC

(57) ABSTRACT

There is provided a valve timing control system for an internal combustion engine which is capable of reducing an aftershock subsequent to a deceleration shock, for which the execution of cleaning operation is responsible, and increasing the frequency of execution of the cleaning operation. The valve timing control system controls valve timing for opening and closing intake valves and/or exhaust valves by changing the cam phase of each intake cam and/or each exhaust cam relative to a crankshaft. A cam phase-varying device varies the cam phase by rotating a camshaft relative to the crankshaft. An ECU determines whether or not the engine is performing a fuel cut-off operation in which supply of fuel to the engine is stopped during deceleration. The ECU performs cleaning by forcibly driving the cam phase-varying device within a predetermined cam phase range when a predetermined delay time has elapsed after the deceleration fuel cut-off operation is started.

3 Claims, 6 Drawing Sheets

FIG. 4

| NGR | #TMVCLDLY |
|---|---|
| 1 (1st) | #TMVCLDLY1 |
| 2 (2nd) | #TMVCLDLY2 |
| 3 (3rd) | #TMVCLDLY3 |
| 4 (4th) | #TMVCLDLY4 |
| 5 (5th) | #TMVCLDLY5 |

VALVE TIMING CONTROL SYSTEM FOR INTERNAL COMBUSTION ENGINE

BACKGROUND OF THE INVENTION

1. Field of the Invention

This invention relates to a valve timing control system for an internal combustion engine, which varies the cam phase of at least one of an intake cam and an exhaust cam, relative to a crankshaft of the engine, to thereby control valve timing, and more particularly to a valve timing control system that executes cleaning to prevent undesired locking of a cam phase-varying device for varying the cam phase.

2. Description of the Prior Art

A valve timing control system of this kind controls valve timing for opening and closing an intake valve and/or an exhaust valve and a valve overlap between the intake and the exhaust valve, by varying the cam phase, thereby controlling the charging efficiency and internal EGR of the engine, with a view to improving the power output thereof and reducing exhaust emissions therefrom. The valve timing control system is disclosed e.g. in Japanese Laid-Open Patent Publication (Kokai) No. 2000-104571. In this control system, a cam phase-varying mechanism supplied with oil pressure which is controlled by an oil pressure control valve varies the cam phase of the intake cam by changing the angle of the intake cam relative to the crankshaft. Further, in this control system, to prevent undesired locking of the oil pressure control valve and the like due to biting of a foreign matter, cleaning is carried out in which the cam phase-varying mechanism is forcibly reciprocated between the most advanced position and the most retarded position. This cleaning is performed over a limited time period for deceleration fuel cut-off operation during which the throttle valve is fully closed, more specifically, immediately after transition of engine operation to the deceleration fuel cut-off operation.

In this control system, however, since the cleaning is started simultaneously with the start of the deceleration fuel cut-off operation, the intake valve is actuated to the most advanced position for execution of the cleaning immediately after the intake pipe pressure has been changed in a negative pressure-increasing direction due to the fully-closed state of the throttle valve. This produces a large valve overlap between the intake valve and the exhaust valve, so that positive pressure is introduced into the intake pipe via the exhaust and intake valves made open in an overlapping fashion, which changes the intake pipe pressure toward the positive pressure side. Thus, at the start of the cleaning, the intake pipe pressure is steeply changed toward the positive pressure side immediately after the preceding increase in negative pressure. This pressure reaction increases the magnitude of an aftershock subsequent to a deceleration shock, causing the driver to feel a large shock, which impairs drivability.

SUMMARY OF THE INVENTION

It is an object of the invention to provide a valve timing control system for an internal combustion engine which is capable of reducing an aftershock subsequent to a deceleration shock, for which the execution of the cleaning is responsible, and increasing the frequency of execution of the cleaning.

To attain the above object, the present invention provides a valve timing control system for an internal combustion engine, for controlling valve timing for opening and closing at least one of an intake valve and an exhaust valve by changing a cam phase which is a phase of at least one of an intake cam and an exhaust cam, relative to the crankshaft, the engine having a camshaft on which at least one of the intake cam and the exhaust cam is arranged.

The valve timing control system is characterized by comprising:

a cam phase-varying device for varying the cam phase by rotating the camshaft relative to the crankshaft;

deceleration fuel cut-off operation-determining means for determining whether or not the engine is performing a fuel cut-off operation in which supply of fuel to the engine is stopped during deceleration; and cleaning control means for forcibly driving the cam phase-varying device within a predetermined cam phase range when a predetermined delay time has elapsed after the deceleration fuel cut-off operation is started, to thereby prevent undesired locking of the cam phase-varying device.

According to the valve timing control system for an internal combustion engine, the cam phase-varying device causes the camshaft to rotate relative to the crankshaft to change the cam phase of an intake cam and/or an exhaust cam, whereby the valve timing for opening and closing an intake valve and/or an exhaust valve is controlled. Further, cleaning in which the cam phase-varying device is forcibly driven within a predetermined cam phase range is carried out when a predetermined time period has elapsed after the deceleration fuel cut-off operation was started. Thus, the cleaning is not carried out before the predetermined time period has elapsed after the start of the deceleration fuel cut-off operation. This causes the intake pipe pressure, which has been changed in a negative pressure-increasing direction due to full closing of the throttle valve immediately before the start of the deceleration fuel cut-off operation, to be increased toward the positive pressure side to some extent and made stable by the time the cleaning is started. Therefore, even if there occurs a large valve overlap between the intake valve and the exhaust valve due to subsequent execution of the cleaning, causing the positive pressure to be introduced into the intake pipe, the amount of change in the intake pipe pressure is small. Thus, a change of the intake pipe pressure in the negative pressure-increasing direction caused by the full closing of the throttle valve and a change of the same toward the positive pressure side caused by execution of the cleaning are produced in a distributed fashion with an appropriate shift in timing. This makes it possible to reduce the magnitude of an aftershock subsequent to the deceleration shock and makes it difficult to be felt by the driver as a shock, thereby improving drivability.

The engine has a transmission connected thereto, and preferably, the valve timing control system further comprises gear ratio-detecting means for detecting a gear ratio of the transmission, and delay time-setting means for setting the delay time to a smaller value as the detected gear ratio is smaller.

In general, the deceleration fuel cut-off operation terminates in a shorter time period as the gear ratio of the transmission is smaller since the engine brake is more effectively applied with a smaller gear ratio. Therefore, according to this preferred embodiment, since the delay time as a waiting time period before execution of the cleaning is set as described above, it is possible to appropriately secure the chance of execution of the cleaning, and increase the frequency of the same.

More preferably, the delay time-setting means sets the delay time to a smaller value when the detected gear ratio has a smallest value than when the detected gear ratio has a value other than the smallest value.

According to this preferred embodiment, even when the transmission is set to the smallest gear ratio in which the deceleration fuel cut-off operation terminates in a shortest time period, it is possible to appropriately secure the chance of execution of the cleaning.

The above and other objects, features, and advantages of the invention will become more apparent from the following detailed description taken in conjunction with the accompanying drawings.

BRIEF DESCRIPTION OF THE DRAWINGS

FIG. 4 shows an example of a table for setting delay time #TMVCLDY;

DETAILED DESCRIPTION OF PREFERRED EMBODIMENT

The invention will now be described in detail with reference to the drawings showing a preferred embodiment thereof.

Figure 1:
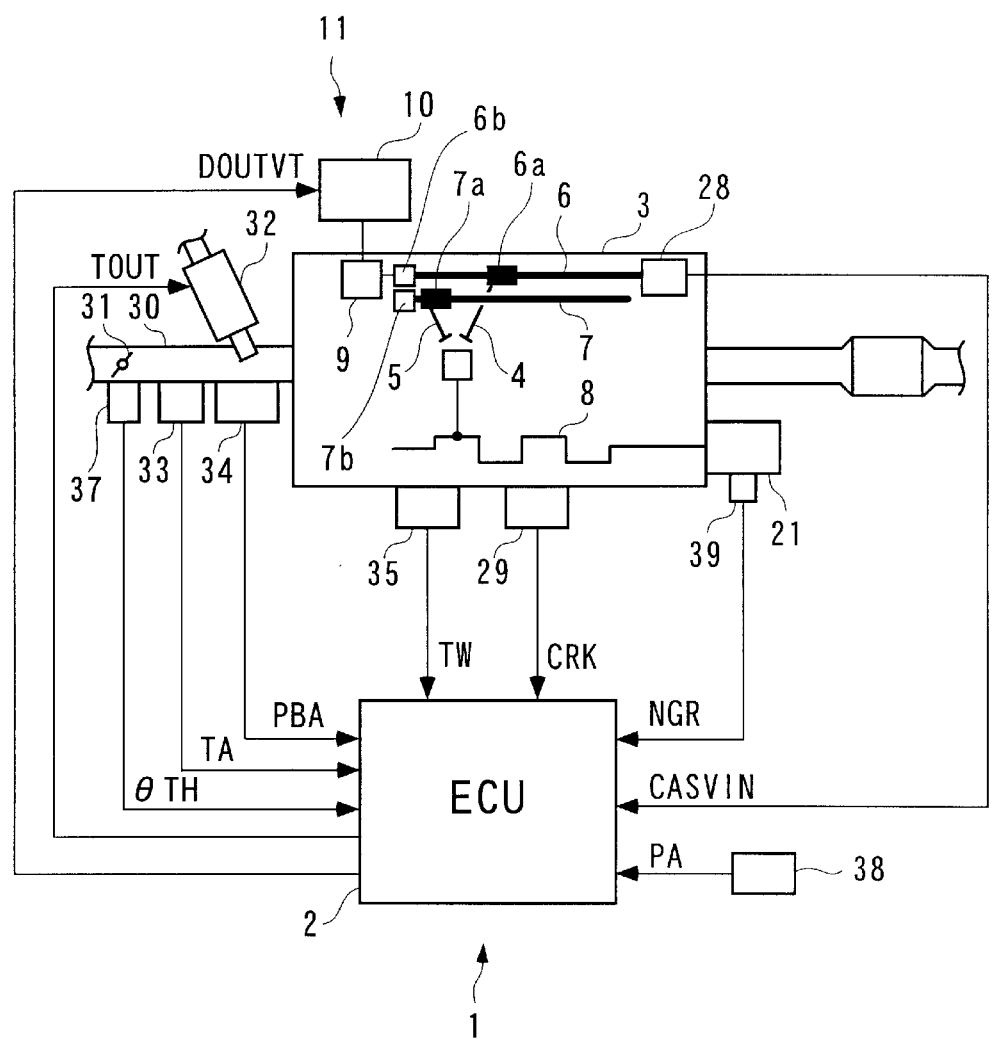
FIG. 1 is a block diagram schematically showing the arrangement of an internal combustion engine incorporating a valve timing control system according to an embodiment of the invention.

Referring first to FIG. 1, there is schematically shown the arrangement of an internal combustion engine incorporating a valve timing control system (hereinafter simply referred to as "the control system") according to an embodiment of the invention. As shown in the figure, the control system 1 includes an ECU 2. In the present embodiment, the ECU 2 forms or implements deceleration fuel cut-off operation-determining means, cleaning control means, and delay time-setting means, and carries out control processes, described hereinbelow, in dependence on operating conditions of the internal combustion engine (hereinafter simply referred to as "the engine") 3.

The engine 3 is e.g. a four-stroke cycle DOHC (double overhead camshaft) gasoline engine, installed on a vehicle, not shown. The engine 3 has a crankshaft 8 thereof connected to drive wheels (not shown) of the vehicle e.g. via a five-speed transmission 21. An intake camshaft 6 and an exhaust camshaft 7 of the engine 3 are connected to the crankshaft 8 by their respective driven sprockets 6b, 7b, and a timing chain, not shown, for rotating through 360 degrees as the crankshaft 8 rotates through 720 degrees. The intake camshaft 6 is integrally formed with a plurality of intake cams 6a (only one of which is shown) for opening and closing respective intake valves 4 (only one of which is shown), and the exhaust camshaft 7 is integrally formed with a plurality of exhaust cams 7a (only one of which is shown) for opening and closing respective exhaust valves 5 (only one of which is shown).

Further, the intake camshaft 6 (camshaft) is connected to the driven sprocket 6b thereof such that the intake camshaft 6 can be rotated or turned relative to the driven sprocket 6b within a range of a predetermined angle. By changing the angle of the intake camshaft 6 relative to the driven sprocket 6b, the phase angle CAIN of each intake cam 6a relative to the crankshaft 8 (hereinafter simply referred to as "the cam phase") is changed to advance or retard timing (valve timing) for opening and closing the intake valve 4. Arranged at one end of the intake camshaft 6 is a cam phase-varying device 11 comprised of a variable timing control mechanism (hereinafter referred to as "the VTC") 9 for controlling the cam phase CAIN, and an oil pressure control valve 10.

The VTC 9 includes an advance chamber, not shown, and a retard chamber, not shown, which are defined on opposite sides of a vane, not shown, integrally formed with the intake camshaft 6, and is configured such that an oil pressure from an oil pump, not shown, driven by the engine 3 is selectively supplied to the advance chamber or the retard chamber under control of the oil pressure control valve 10 to thereby turn the intake camshaft 6 in an advancing direction or a retarding direction relative to the driven sprocket 6b.

The oil pressure control valve 10 is formed by a duty solenoid valve which includes a solenoid, not shown, and a spool, not shown, actuated by the solenoid. The oil pressure control valve 10 is configured such that the position of the spool thereof is continuously changed according to an output duty factor DOUTVT, controlled by the ECU 2, of current (pulse current) supplied to the solenoid. The advance chamber or retard chamber of the VTC 9 is opened and closed depending on the position of the spool. More specifically, when the output duty factor DOUTVT of current to be supplied to the oil pressure control valve 10 (hereinafter simply referred to as "the output duty factor DOUTVT") is larger than a hold duty factor value (e.g. 50%) for holding the cam phase, the spool of the oil pressure control valve 10 is moved from its neutral position toward one side for opening the advance chamber, whereby the oil pressure is supplied to the advance chamber to bring the VTC 9 to an advanced position for advancing the cam phase CAIN. On the other hand, when the output duty factor DOUTVT is smaller than the hold duty factor value, the spool is moved from its neutral position toward the other side for opening the retard chamber, whereby the oil pressure is supplied to the retard chamber to bring the VTC 9 to a retarded position for retarding the cam phase CAIN. It should be noted that the intake cam 6a can be moved through 60 degrees crank angle with its most retarded position being 25 degrees crank angle BTDC and its most advanced position being 85 degrees crank angle BTDC. The cam phase CAIN is 0 degrees crank angle when the VTC 9, i.e. the intake cam 6a is in the most retarded position, and 60 degrees crank angle when the same is in the most advanced position.

Further, when the output duty factor DOUTVT is equal to the hold duty factor value, the oil pressure control valve 10 is in a cam phase-holding position in which the spool thereof is in the neutral position for simultaneously closing the advance chamber and the retard chamber. In this state, supply of the oil pressure to the advance chamber and the retard chamber is cut off, and the intake camshaft 6 and the driven sprocket 6b are fixedly connected to each other, whereby the cam phase CAIN is held at a value to which it has been controlled by the VTC 9.

A cam angle sensor 28 is arranged at the other end of the intake camshaft 6, opposite to the one end at which the VTC 9 is arranged. The cam angle sensor 28 is comprised e.g. of a magnet rotor and an MRE (magnetic resistance element) pickup, and detects a cam angle CASVIN of the intake cam 6a measured with respect to a position thereof corresponding to a TDC (top dead center) position of a corresponding piston, not shown, in accordance with the rotation of the camshaft 6, and delivers a signal indicative of the sensed cam angle CASVIN to the ECU 2. The crankshaft 8 has a crank angle position sensor 29 arranged therefor. The crank angle position sensor 29 is constructed similarly to the above cam angle sensor 28, and delivers a pulse of a CRK signal as a pulse signal to the ECU 2 whenever the crankshaft 8 rotates through a predetermined angle (e.g. 30 degrees). The ECU 2 calculates (detects) an actual cam phase CAIN based on the CRK signal and the signal indicative of the cam angle CASVIN output from the cam angle sensor 28 (hereinafter, the cam phase actually detected as described above will be referred to as "the actual cam phase CAIN". Further, the ECU 2 determines a rotational speed NE of the engine 3 (hereinafter referred to as "the engine rotational speed NE") based on the CRK signal.

The engine 3 has an intake pipe 30 in which is arranged a throttle valve 31 having a throttle valve opening sensor 37 attached thereto. Further, injectors 32 (only one of which is shown), an intake air temperature sensor 33, and an intake air pressure sensor 34 are inserted into the intake pipe 30 at respective locations downstream of the throttle valve 31. Each injector 32 has its fuel injection time period TOUT controlled by a drive signal delivered from the ECU 2.

The intake air temperature sensor 33 senses a temperature (intake air temperature TA) of intake air within the intake pipe 30 and supplies a signal indicative of the sensed intake air temperature TA to the ECU 2. The intake air pressure sensor 34 senses an absolute pressure PBA within the intake pipe 30 (hereinafter referred to as "the intake pipe absolute pressure PBA") and supplies a signal indicative of the sensed intake pipe absolute pressure PBA to the ECU 2. The throttle valve opening sensor 37 senses an opening degree θTH of the throttle valve 31 (hereinafter referred to as "the throttle valve opening θTH) and supplies a signal indicative of the sensed throttle valve opening θTH to the ECU 2. Further, an engine coolant temperature sensor 35 is mounted in the cylinder block of the engine 3. The engine coolant temperature sensor 35 senses a temperature (engine coolant temperature TW) of an engine coolant circulating through the cylinder block of the engine 3 and supplies a signal indicative of the sensed engine coolant temperature TW to the ECU 2. Also input to the ECU 2 are a signal indicative of atmospheric pressure PA detected by an atmospheric pressure sensor 38 and a signal indicative of a gear position number NGR corresponding to the gear position (gear ratio) of the transmission 21 detected by a gear position sensor 39 (gear ratio-detecting means). The gear position number NGR assumes values of 1 to 5 assigned to respective first-speed to fifth-speed gear positions of the transmission 21.

The ECU 2 is formed by a microcomputer including an I/O interface, a CPU, a RAM, and a ROM, none of which are shown. The signals from the above sensors are each input to the CPU after A/D conversion and waveform shaping by the I/O interface.

The CPU 2 determines an operating condition of the engine 3 based on these input signals, and in dependence on the determined operating condition, carries out control of the VTC 9 (hereinafter referred to as "the VTC control") in the manner described hereinafter, according to a control program and data read from the ROM, and data read from the RAM.

Figure 2:
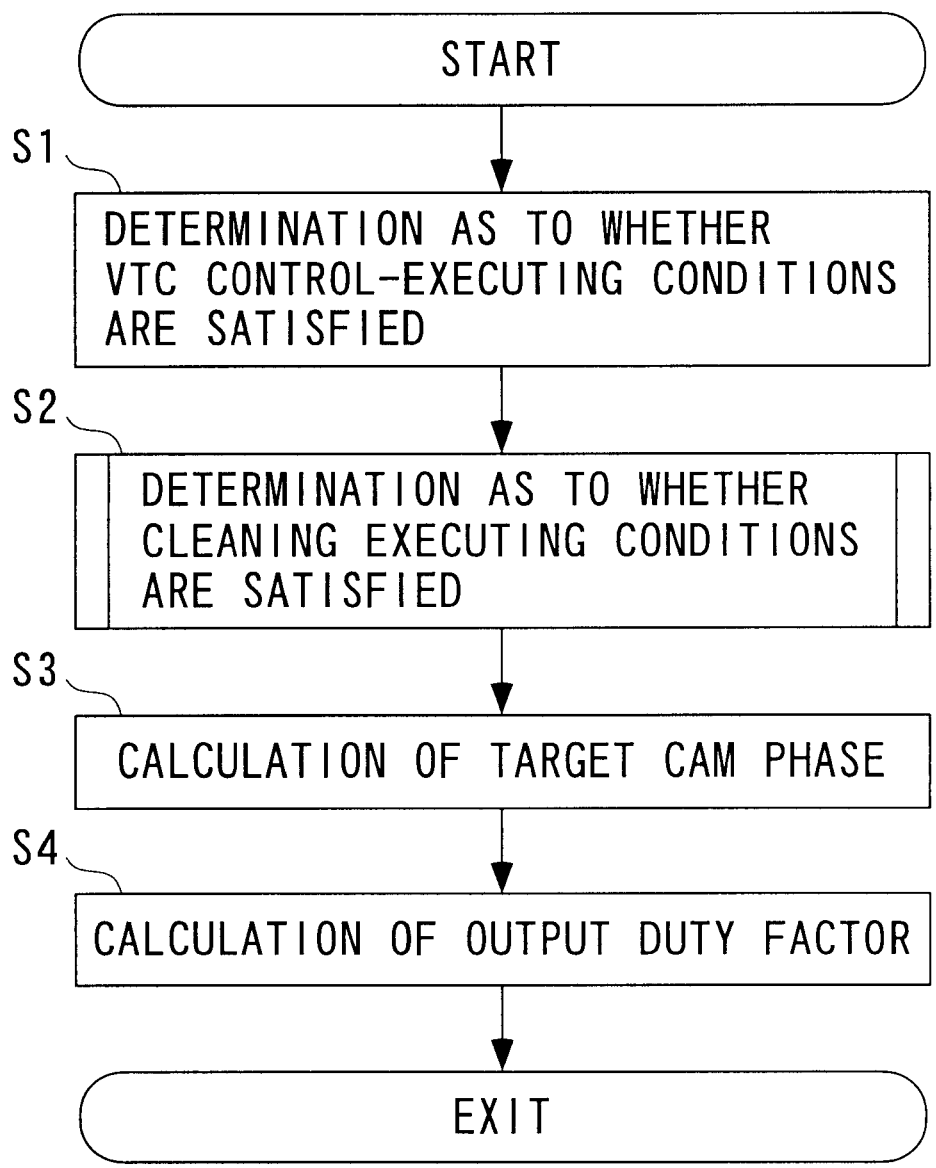
FIG. 2 is a flowchart showing a main flow of a VTC control process carried out by the FIG. 1 valve timing control system.

FIG. 2 is a flowchart showing a main routine of an overall control process for the above VTC control. This control process is executed at predetermined time intervals (e.g. every 10 ms). First, in a step S1, it is determined based on the engine coolant temperature TW, the engine rotational speed NE, and so forth whether or not conditions for executing the VTC control are satisfied to permit or inhibit execution of the VTC control. Then, it is determined in a step S2 whether or not conditions for executing the cleaning of the VTC 9 are satisfied. The cleaning is carried out by forcibly driving the oil pressure control valve 10 and the VTC 9 from the most retarded position to the most advanced position for the purpose of prevention of undesired locking of the VTC 9 and the oil pressure control valve 10 due to biting of foreign matter or the like. Details of a process for the determination will be described hereinafter.

Then, in a step S3, a target cam phase CAINCMD is calculated based on operating conditions of the engine 3, including the engine rotational speed NE and the intake pipe absolute pressure PBA. Then, according to the target cam phase CAINCMD and the actual cam phase CAIN, the output duty factor DOUTVT is calculated by feedback control, and a drive signal based on the result of the calculation is delivered to the oil pressure control valve 10 in a step S4, followed by terminating the present process. It should be noted that if the execution of cleaning is permitted in the step S2, the output duty factor DOUTVT is set to its upper limit value (e.g. 95%) in the step S4, whereby the cleaning is carried out.

Figure 3:
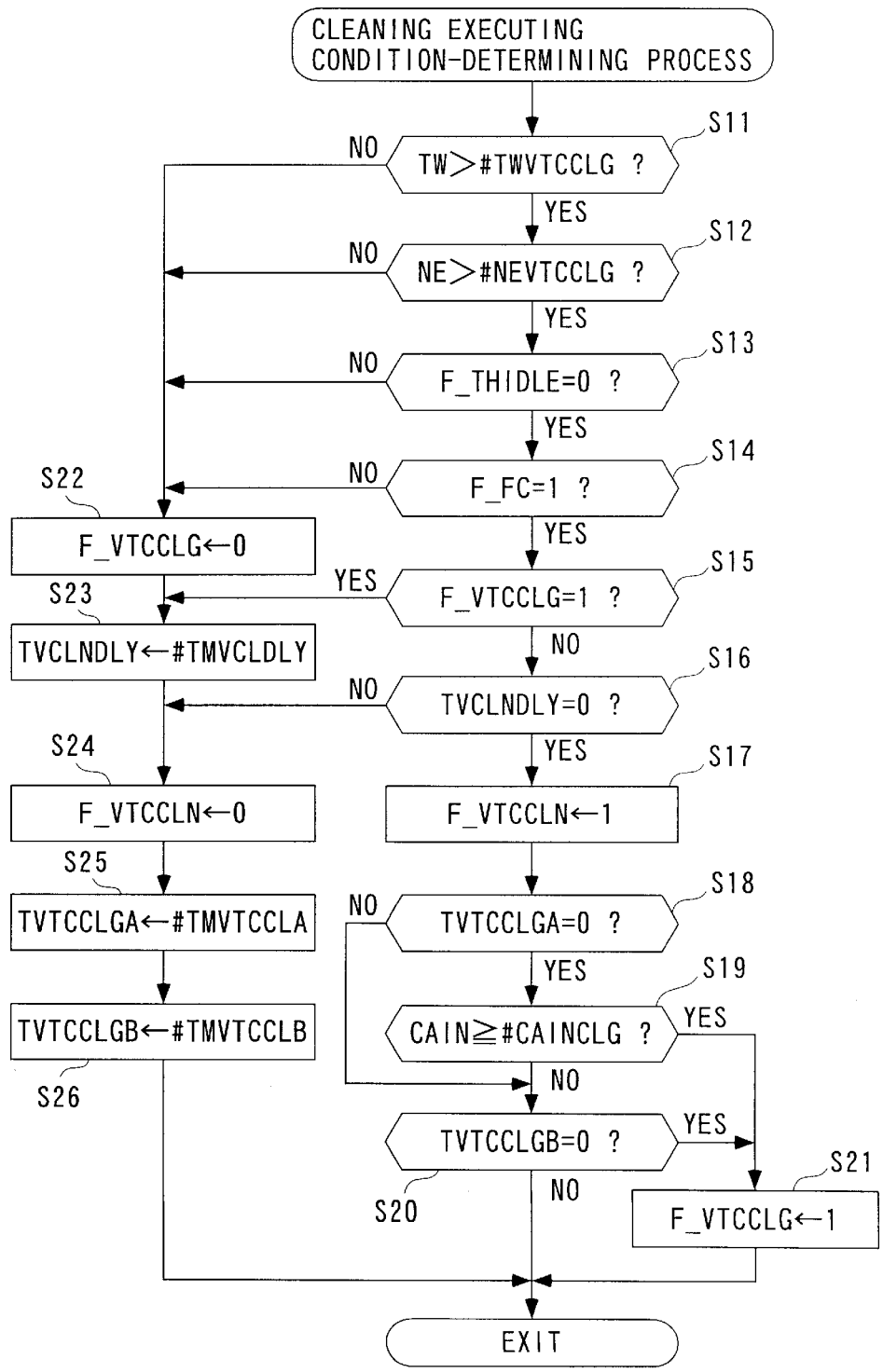
FIG. 3 is a flowchart of a subroutine for a process for determining whether or not cleaning-executing conditions are satisfied, which is executed in the FIG. 2 main flow.

FIG. 3 shows a subroutine for executing the process for determining whether or not the conditions for executing the cleaning (cleaning executing conditions) are satisfied. It should be noted that in the following description, fixed values stored beforehand in the ROM as data items and table values are discriminated from other variables that are stored in the RAM and updated, by adding a character # to each of respective reference marks for the fixed values.

In this process, first in a step S11, it is determined whether or not the engine coolant temperature TW is higher than a lower limit value #TWVTCCLG (e.g. 80° C.). If the answer to this question is negative (NO), i.e. if TW≦#TWVTCCLG holds, it is judged that the cleaning should not be executed since the hydraulic fluid of the VTC 9 is low in temperature and hence the VTC 9 is poor in controllability due to insufficient warm-up of the engine. Therefore, a cleaning completion flag F_VTCCLG is set to 0 in a step S22; a cleaning delay timer TVCLNDLY of a downcount type is set to a predetermined delay time #TMVCLDLY in a step S23; a cleaning permission flag F_VTCCLN is set to 0 in a step S24; a cleaning duration timer TVTCCLGA of a downcount type is set to a predetermined time period #TMVTCCLA (e.g. 0.3 seconds) in a step S25; and a cleaning termination timer TVTCCLGB similar to the cleaning duration timer TVTCCLGA is set to a predetermined time period #TMVTCCLB (e.g. 1.0 second) in a step S26, followed by terminating the present program.

The delay time #TMVCLDLY is set by looking up a table shown in FIG. 4 according to the gear position of the transmission 21. In this table, a delay time value #TMVCLDLY1 to a delay time value #TMVCLDLY5 are set in a manner associated with the values of the gear position numbers NGR1 to NGR5 (first speed to fifth speed), respectively. These delay time values #TMVCLDLY1 to #TMVCLDLY5 are basically configured such that the delay time value is smaller as the value of the gear position number NGR is smaller, i.e. the gear ratio is smaller. For example, they are set as #TMVCLDLY1=2.0 seconds,

TMVCLDLY2=2.5 seconds, and #TMVCLDLY3 to #TMVCLDLY5=3.0 seconds. This is because as the gear ratio is smaller, the engine brake is more effectively applied, so that the deceleration fuel cut-off is terminated in a shorter time period, and therefore, the delay time is set according to this tendency to appropriately secure the chance of execution of the cleaning.

If the answer to the question of the step S11 is affirmative (YES), it is determined whether or not the engine rotational speed NE is higher than a lower limit value #NEVTCCLG (e.g. 2000 rpm) in a step S12. If the answer to this question is negative (NO), i.e. if NE≦#NEVTCCLG holds, it judged that the cleaning should not be executed since the engine rotational speed NE is low and hence duration of the deceleration cut-off operation is short and may be inconveniently terminated before completion of the cleaning, so that the steps S22 to S26 are executed, followed by terminating the present program.

If the answer to the question of the step S12 is affirmative (YES), it is determined in a step S13 whether or not a fully-closed throttle flag F_THIDLE assumes 0, and in a step S14 whether or not a fuel cut-off flag F_FC assumes 1. If either of the answers to the questions of the steps S13 and S14 is negative (NO), i.e. if the throttle valve 31 is not substantially fully closed or the engine 3 is not performing the deceleration fuel cut-off operation, it is judged that the cleaning-executing conditions are not satisfied, so that the steps S22 to S26 are executed, followed by terminating the present program.

On the other hand, if both of the answers to the questions of the steps S13, 14 are affirmative (YES), i.e. if under the condition of satisfaction of TW>#TWVTCCLG and NE>#NEVTCCLG, the throttle valve 31 is substantially fully closed, and at the same time the engine 3 is performing the deceleration fuel cut-off operation, it is judged that the cleaning-executing conditions are satisfied, and the program proceeds to a step S15 wherein it is determined whether or not the cleaning completion flag F_VTCCLG assumes 1. If the answer to this question is negative (NO), i.e. if the cleaning has not been completed, it is determined in a step S16 whether or not the count of the cleaning delay timer TVCLNDLY is equal to 0. If the answer to this question is negative (NO), i.e. if the delay time #TMVCLDLY has not elapsed after satisfaction of the conditions for execution of the cleaning, the program proceeds to the steps S24 to S26 to withhold execution of the cleaning.

On the other hand, if the answer to the question of the step S16 is affirmative (YES), i.e. if the delay time #TMVCLDLY has elapsed after satisfaction of the cleaning-executing conditions, it is judged that the cleaning should be executed, so that the cleaning permission flag F_VTCCLN is set to 1 in a step S17. According to execution of the step S17, the output duty factor DOUTVT is set to the upper limit (e.g. 95%) in the step S4 in FIG. 2, whereby the oil pressure control valve 10 and the VTC 9 are each forcibly driven from the most retarded position to the most advanced position, i.e. the cleaning is executed.

In a step S18 following the step S17, it is determined whether or not the count of the cleaning duration timer TVTCCLGA set in the step S25 is equal to 0. If the answer to this question is negative (NO), i.e. if the predetermined time period #TMVTCCLA has not elapsed after the start of execution of the cleaning, the program proceeds to a step S20, referred to hereinafter, to unconditionally continue the cleaning. On the other hand, if the answer to the question of the step S18 is affirmative (YES), it is determined in a step S19 whether or not the actual cam phase CAIN is equal to or higher than a predetermined value #CAINCLG (e.g. 45 degrees). If the answer to this question is affirmative (YES), i.e. if CAIN≧#CAINCLG holds, it is judged that the cleaning is completed since the actual cam phase CAIN has been sufficiently advanced, so that the cleaning completion flag F_VTCCLG is set to 1 in a step S21, followed by terminating the program.

On the other hand, if the answer to the question of the step S19 is negative (NO), i.e. if CAIN<#CAINCLG holds, it is determined in the step S20 whether or not the count of the cleaning termination timer TVTCCLGB set in the step S26 is equal to 0. If the answer to this question is negative (NO), the present program is immediately terminated, whereas if it is affirmative (YES), i.e. if the cam phase CAIN has not reached the predetermined value #CAINCLG even when the predetermined time period #TMVTCCLB has elapsed after the start of execution of the cleaning, the step S21 is executed to terminate the cleaning. This is to avoid the following inconvenience: If the most advanced position is continued for a long time during the deceleration fuel cut-off operation, the intake pipe absolute pressure continues to assume an increased value, i.e. a value shifted toward the positive pressure side, which lowers deceleration feeling and hence impairs marketability of the vehicle.

It should be noted that after the cleaning completion flag F_VTCCLG is set to 1 by execution of the step S21, the answer to the question of the step S15 becomes affirmative (YES), and in this case, the program proceeds to the step S23 et seq. That is, if the cleaning has been completed, so long as the cleaning-executing conditions of the steps S11 to S14 continue to be satisfied, a second operation of the cleaning is not executed. Further, if any of the steps S11 to S14 becomes negative, the cleaning completion flag F_VTCCLG is set to 0 in the step S22, and hence when the cleaning-executing conditions are satisfied thereafter, the cleaning is executed next time.

Figure 5:
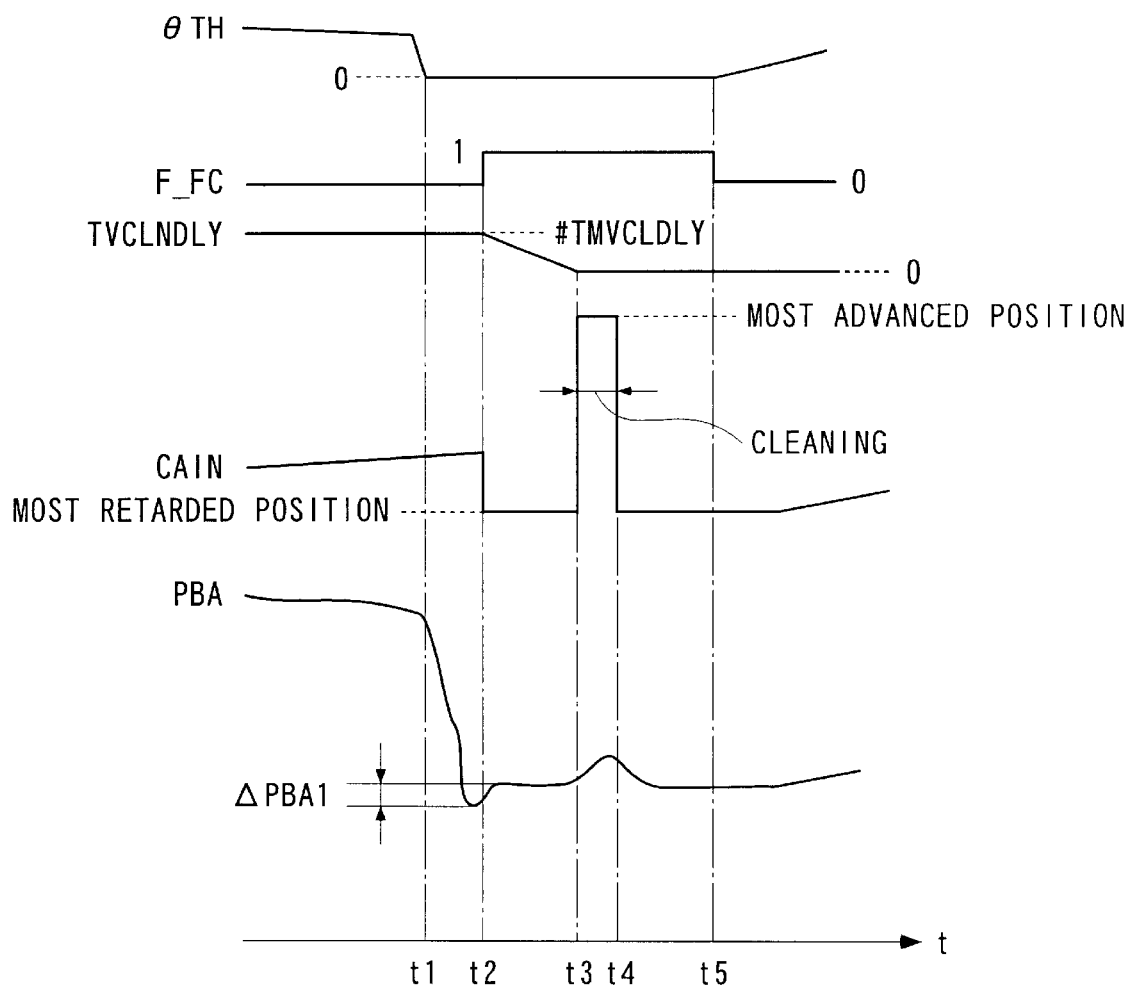
FIG. 5 is a timing chart showing an example of operations executed by the FIG. 3 process.
Figure 6:
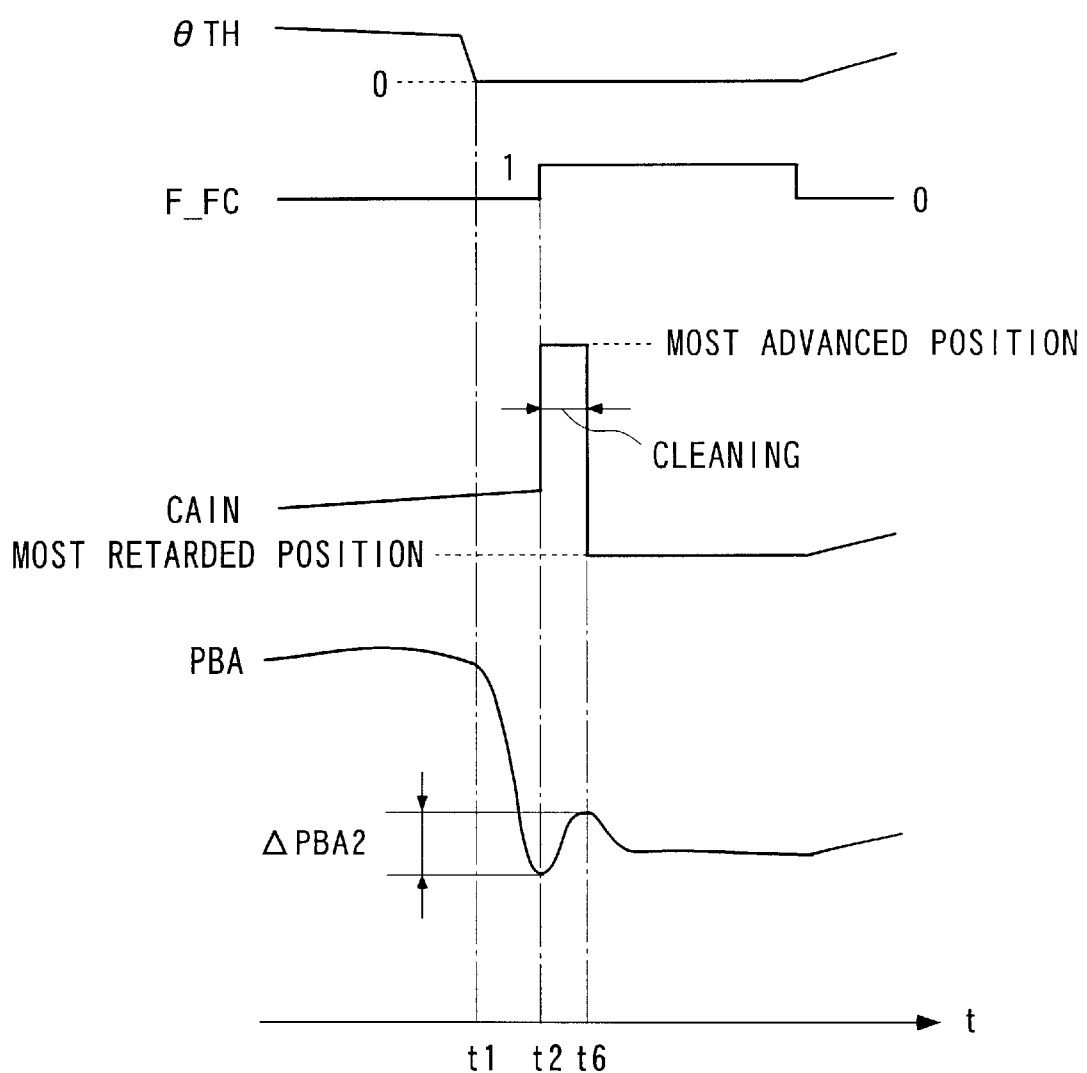
FIG. 6 is a timing chart showing an example of operations executed by the conventional valve timing control system.

FIG. 5 shows an example of operations executed by the FIG. 3 process, and FIG. 6 shows an example of operations executed by a conventional cleaning control process under the same operating conditions for comparison with the FIG. 5 case. More specifically, it is assumed that at a time t1, the throttle valve 31 is fully closed, and at a time t2 subsequent thereto, the deceleration fuel cut-off operation is started (F_FC=1). In the FIG. 6 conventional case, at this time, the actual cam phase CAIN immediately starts to be changed toward a value corresponding to the most advanced position to execute the cleaning (times t2 to t7). As a result, as described hereinbefore, immediately after the intake pipe absolute pressure PBA has been changed in a decreasing direction (in a negative pressure-increasing direction) due to full closing of the throttle valve, the cleaning is executed to steeply change the intake pipe absolute pressure PBA in an increasing direction (toward the positive pressure side), which produces a large variation amount ΔPBA2, and the resulting pressure reaction increases the magnitude of an aftershock subsequent to a deceleration shock, causing the driver to feel a large shock.

In contrast, in the FIG. 5 case of the present embodiment, when the deceleration fuel cut-off operation is started (time t2), the cleaning delay timer TVCLNDLY starts to operate, and at this time point, the cleaning is not executed, but the actual cam phase CAIN is held at a value corresponding to the most retarded position. This results in a smaller aftershock (variation amount ΔPBA1) after the intake pipe absolute pressure PBA has been changed in the decreasing direction due to full closing of the throttle valve 31, than the conventional one (variation amount ΔPBA2). Thereafter, when the delay time #TMVCLDLY has elapsed after the start of the deceleration fuel cut-off operation (time t3), the execution of the cleaning is started to forcibly drive each of the oil pressure control valve 10 and the VTC 9 from the most retarded position to the most advanced position, whereby the actual cam phase CAIN is controlled to the value corresponding to the most advanced position. At this time point, the intake pipe absolute pressure PBA has been increased to some extent and made stable. Therefore, even if positive pressure is introduced into the intake pipe due to a valve overlap caused by execution of the cleaning, this causes a smaller amount of variation of the intake pipe absolute pressure PBA.

As described above, according to the present embodiment, it is possible to cause a change of the intake pipe absolute pressure PBA in the decreasing direction caused by the full closing of the throttle valve 31 and a change of the same in the increasing direction caused by execution of the cleaning, in a distributed fashion with an appropriate shift in timing. This makes it possible to reduced the aftershock subsequent to the deceleration shock and makes it difficult for the driver to feel it as a shock, thereby improving drivability. Further, as described hereinbefore, the delay time #TMVCLDLY is set to a smaller value as the gear ratio of the transmission 21 is smaller, which makes it possible to appropriately secure the chance of execution of the cleaning, and increase the frequency of execution of the same.

Thereafter, when the actual cam phase CAIN becomes equal to or larger than the predetermined value #CAINCLG, the cleaning is terminated (time t4), and the actual cam phase CAIN is returned to the most retarded position. Then, when an accelerator pedal, not shown, is stepped on to open the throttle valve 31, the deceleration fuel cut-off operation is terminated (F_FC=0) at a time t5, and the actual cam phase CAIN is feed-back controlled according to the target cam phase CAINCMD.

The present invention is not limited to the embodiment described above by way of example, but can be carried out in various forms. For instance, although in the above embodiment, the delay time #TMVCLDLY is set according to the gear ratio of the transmission 21, this is not limitative, but it may be set to an appropriate fixed value. Further, although in the above embodiment, the delay time #TMVCLDLY is set to a smallest value when the transmission 21 is set to the first speed, a medium value when the same is set to the second speed, and a largest value when the same is set to any of the third to fifth speeds, this is not limitative, but the delay time #TMVCLDLY may be set to different values for the first to fifth speeds, such that it assumes a smaller value as the gear ratio of the transmission 21 is smaller, or it may be set to a smaller value for the first speed, which is different from a value for the other speeds. In the latter case, even when the transmission is set to the smallest gear ratio in which the engine brake is very effectively applied and the deceleration fuel cut-off operation is terminated in a shortest time period, the chance of execution of the cleaning can be appropriately secured.

Further, although in the above embodiment, the present invention is applied by way of example to a valve timing control system in which the cam phase of each intake cam is variable, this is not limitative, but it goes without saying that the present invention can be applied to a valve timing control system in which the cam phase of each exhaust cam is variable in place of or in combination of the variable cam phase of each intake valve.

It is further understood by those skilled in the art that the foregoing is a preferred embodiment of the invention, and that various changes and modifications may be made without departing from the spirit and scope thereof.

What is claimed is:

1. A valve timing control system for an internal combustion engine, for controlling valve timing for opening and closing at least one of an intake valve and an exhaust valve by changing a cam phase which is a phase of at least one of an intake cam and an exhaust cam, relative to the crankshaft, the engine having a camshaft on which at least one of the intake cam and the exhaust cam is arranged, the valve timing control system comprising:
a cam phase-varying device for varying the cam phase by rotating the camshaft relative to the crankshaft;
deceleration fuel cut-off operation-determining means for determining whether or not the engine is performing a fuel cut-off operation in which supply of fuel to the engine is stopped during deceleration; and
cleaning control means for forcibly driving said cam phase-varying device within a predetermined cam phase range when a predetermined delay time has elapsed after the deceleration fuel cut-off operation is started, to thereby prevent undesired locking of said cam phase-varying device.

2. A valve timing control system according to claim 1, wherein the engine has a transmission connected thereto, and wherein the valve timing control system further comprises gear ratio-detecting means for detecting a gear ratio of the transmission, and delay time-setting means for setting the delay time to a smaller value as the detected gear ratio is smaller.

3. A valve timing control system according to claim 2, wherein said delay time-setting means sets the delay time to a smaller value when the detected gear ratio has a smallest value than when the detected gear ratio has a value other than the smallest value.

* * * * *